United States Patent [19]

Flynn

[11] 4,151,688

[45] May 1, 1979

[54] POWER BOOM AND VACUUM HOSE SUPPORT

[75] Inventor: Thomas P. Flynn, Milwaukee, Wis.

[73] Assignee: Super Products Corporation, Milwaukee, Wis.

[21] Appl. No.: 838,459

[22] Filed: Oct. 3, 1977

Related U.S. Application Data

[62] Division of Ser. No. 697,825, Jun. 21, 1976, Pat. No. 4,068,824.

[51] Int. Cl.[2] ........................ E04H 12/34; F16H 25/08

[52] U.S. Cl. ........................................ 52/115; 212/8 R; 414/680; 74/54

[58] Field of Search .......................... 52/115, 111, 114; 74/54; 182/2; 254/139.1, 143; 214/130, 132, 133; 212/8 R; 92/129; 251/76, 78, 77

[56] References Cited

U.S. PATENT DOCUMENTS

| | | | |
|---|---|---|---|
| 2,153,885 | 4/1939 | Goldberg et al. | 251/56 |
| 2,408,387 | 10/1946 | Gay et al. | 182/2 |
| 2,885,906 | 5/1959 | Cupedo | 74/54 |
| 3,329,290 | 7/1967 | Lowery | 182/2 |

*Primary Examiner*—James L. Ridgill, Jr.

[57] ABSTRACT

A horizontally rotatable and vertically elevatable power boom is disclosed. The boom includes a link providing increased lifting torque about the boom hinge pin and the boom assembly is designed for minimizing the head room requirements for the vacuum machine without sacrificing payload capacity. The link also permits the boom to be locked down hydraulically for traveling.

5 Claims, 6 Drawing Figures

POWER BOOM AND VACUUM HOSE SUPPORT

BACKGROUND OF THE INVENTION

This is a division, of application Ser. No. 697,825, filed June 21, 1976.

The present invention relates generally to the art of industrial vacuum loaders and cleaners, and more specifically to the art of boom and hose support systems for such machines. Many varieties of such loaders and cleaners are known to the art, including mobile and stationary machines, and the uses for such machines are as varied as the designs themselves. For example, such machines are used for cleaning gutters, sewers, catch-basins and industrial plants or for loading particulate solids or liquid materials. One type of mobile industrial vacuum loader and cleaner is described in detail in U.S. Pat. No. 3,885,932, issued May 27, 1975, to Lionel G. Moore, et al., entitled "Dust Filtration System." A common feature of machines of the class described is a heavy duty intake hose, which may or may not include an intake nozzle. Such machines also commonly include hose supports and systems for manipulating the hose or a hose in combination with a metal pipe attached to the end. The hose and pipe may be in excess of 20 feet in length and may weigh in excess of 300 pounds. The support and manipulative systems may include means for horizontally and vertically moving the hose to position the free end of the hose adjacent to the materials to be collected. The outlet end of the hose is commonly coupled to a container or truck body and the machines include a vacuum system for creating an air flow through the hose to draw the material to be collected or loaded through the hose and into the container or body.

Some larger machines may include a plurality of inlet openings to the body or container, one or more of which are coupled to hoses during operation. The hose support and manipulative systems permit coupling of the heavy hoses to selected ones of these openings.

Several major problems are encountered with the boom and hose support and manipulative systems of the prior art. As previously mentioned, the hoses are heavy and quite stiff, and in addition the hoses are relatively expensive. The hoses of the prior art devices have a tendency to kink or tear resulting in reduced hose lifetimes and expensive repair or replacement. The intake end of the hose commonly must be elevated ten feet or more for maximum collection and loading efficiency for a variety of job applications. These problems are particularly pronounced if a pipe is attached to the free end for the purpose of cleaning pits or catch basins.

Most prior art devices simply employ a collar fixedly secured to a point of the hose near its mid-point and a cable attached to the collar and the free end of a boom for raising the collar, and in turn, the section of the hose to which the collar is attached. This technique is not a satisfactory solution to the problem of hose kinking, because the optimum position for hose support varies along the hose as the lift height is varied. Even with those prior art systems which utilize a plurality of collars secured to the hose, the kinking problem is not overcome. Furthermore, these prior art devices do not provide uniform support for the bent portion of the hose.

The prior art booms associated with the hose support and manipulative systems also suffer from certain disadvantages. Among these is providing sufficient lifting torque about the hinge pin without increasing the head room requirements for the machine or sacrificing payload capacity.

A boom and hose cradle and support system which overcomes the aforementioned problems would be a significant advance in the vacuum loading and cleaning technology.

OBJECTS OF THE INVENTION

It is a primary object of the present invention to provide a boom and hose cradle and support system which overcomes the aforementioned disadvantages.

It is an object of the invention to provide a boom which is horizontally rotatable about a pivot pin and which has a free end elevatable with maximum lifting torque.

Another object of the invention is to provide a link in the boom elevating mechanism which reduces the overall head room requirements of the device and provides such advantageous lifting torque.

A further object of the invention is to provide a link in the boom assembly which permits the boom to be locked in a horizontal position or to float in a slightly elevated position during operation.

A still further object of the invention is to provide a hose support cradle for industrial vacuum loading and cleaning hoses.

Another object of the invention is to provide such a cradle which supports the hose throughout the bend of the hose and which permits, if required, sliding motion of the cradle along the length of the hose as the hose position changes.

Yet another object of the invention is to provide a pulley and cable system for supporting such a cradle from the free end of the boom of an industrial vacuum cleaner and loader.

Another object of the invention is to provide such a pulley and cable system which permits the hose cradle to adjust to an infinite number of different positions, between set limits, along the hose length as the elevation of the boom is varied and which causes elevation of the free end of the hose to exceed the amount of elevation of the free end of the boom.

How these and other objects of the invention are accomplished will be described in the following specification taken in conjunction with the FIGURES. Generally, however, they are accomplished by employing a generally C-shaped hose cradle having a plurality of guide rings on the outside of the "C". The curvature of the cradle is designed for optimizing the support features for the particular machine, hose, hose flexing characteristics and elevation limits. The hose is free to slide over the outside of the cradle within the guide rings. The cradle is attached to the free end of an elevatable boom by a pulley and a cable passing through the pulley and connected to spaced apart ones of the guide rings of the cradle. As the boom is elevated the cable travels on the pulley in response to the natural bending forces imposed by the hose as the relative vertical position of the guide rings of the cable change. The hose slides within the cradle, also in response to these forces. The hose is supported by the longitudinal members of the cradle to permit sliding without catching on the hose convolutions. The pulley movement causes an elevation of the hose end which exceeds the elevation of the boom end. The boom itself includes a link between the piston rod of a hydraulic cylinder and the hinge pin. The link permits the boom to float at a slightly raised position during use or to be locked in the horizontal position. The link also increases the lifting efficiency of the cylinder by maximizing the lifting torque about the hinge pin.

DESCRIPTION OF THE PREFERRED EMBODIMENT

Figure 1:
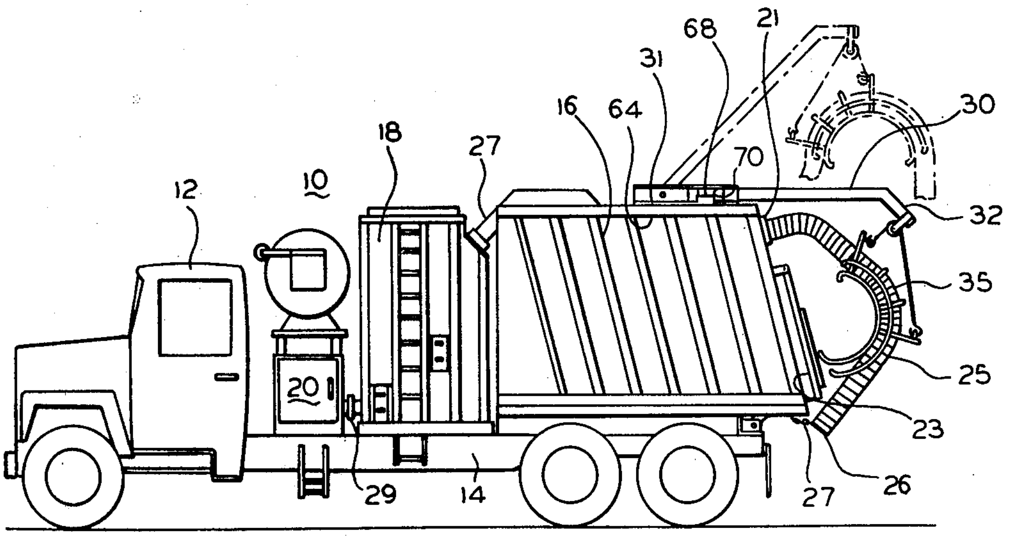
FIG. 1 is a side view of a mobile industrial vacuum cleaner and loader having a boom supported hose cradle and support system according to one preferred form of the present invention, with the boom in the lowered position.

FIGS. 1-6 illustrate one preferred embodiment of the present invention, and for purposes of illustration, a mobile vacuum loader and cleaner 10 has been chosen as the basic device to which the invention is adapted. It should be clearly stated at the outset, however, that the use of this particular mobile cleaner is not to be taken as limiting because the invention is suitable for other mobile vacuum cleaning devices and to stationary vacuum cleaning devices, vacuum tankers, pumpers or any other mechanism using large diameter heavy hoses. For these reasons most of the features of the mobile cleaner shown in FIG. 1 will be described in a summary fashion as such features do not, in and of themselves, form a part of the present invention.

Cleaner 10 includes a cab 12 and a chassis 14 for supporting three main cleaner components: a body or receptable 16, a filter 18 and a pump or blower 20. Receptacle 16 includes at least one inlet opening 21 and a tailgate 23 which may be opened manually or by power means for removing the material collected during operation. Coupled to inlet 21 is a hose 25. The receptacle 16 and filter 18 are connected by a duct 27 and the filter 18 and pump 20 are connected by another duct 29. In operation, cleaner 10 is driven to the work location. The pump 20 is activated to create a high velocity air stream flow through hose 25. The machine operator positions the free end 26 of hose 25 above the material to be collected and the material is sucked through hose 25 into receptable 16. The air stream flows from receptacle 16 to the filter 18 through duct 27 and any fine particulate material entrained in the air stream is removed by filter 18. The air stream leaves the filter 18 and passes to the pump 20 through duct 29 and is subsequently discharged to the atmosphere.

Details of the component 16, 18, and 20 can be found by reference to the aforementioned U.S. Pat. No. 3,885,932, but as stated hereinbefore, the invention which will now be discussed can be adapted to other designs of receptacles, filters, and pumps. For some job applications the filter 10 may be omitted, and for those job applications in which the collected material is a liquid, it may be pushed or pumped from the collector body through the hose in the reverse direction.

Turning now to the details of the invention, hose 25 is the usual case is heavy, relatively stiff hose having an internal diameter of from 2 to 24 inches. In a typical machine the hose will be approximately 10 feet long and will weigh on the order of 300 pounds. Such a hose is difficult to manipulate manually and frequent hose movement is required both for collection of material during operation of the machine and for elevating hose 25 away from tailgate 23 when tailgate 23 is opened for removal of collected material. For machines such as that illustrated in FIG. 1, it may be necessary to raise the free end 26 of hose 25 up to 15 feet. To accomplish this magnitude of movement of hose position, the invention provides a horizontally rotatable and vertically elevatable boom 30. Boom 30 includes a first end 31 rigidly or pivotally mounted to any of several possible connecting points on receptable 16 and a second of free end 32 extending beyond the tailgate 23 at the rear of receptable 16. Discussion of the details of the boom construction will be deferred to a later point in this specification, but it should be noted here that the free end 32 of the boom 30 can be raised above the horizontal (see FIGS. 2 and 3) and can be rotated while in an elevated position through a circle having a center defined by the connection point of end 31 and a radius determined by the degree of elevation of the free end 32 of boom 30.

Figure 2:
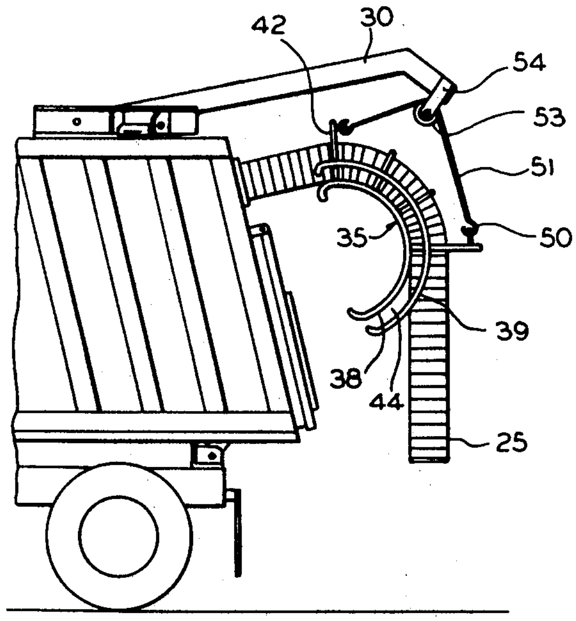
FIG. 2 is a side view of the cleaner and loader of FIG. 1, with parts removed, showing the boom in a first operating position.
Figure 3:
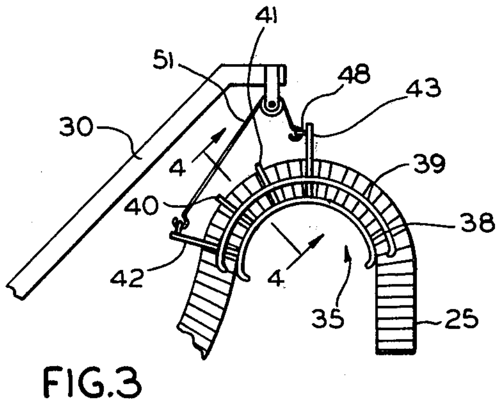
FIG. 3 is a side view of the cleaner and loader of FIG. 1, with parts removed, showing the boom in the fully elevated position.
Figure 4:
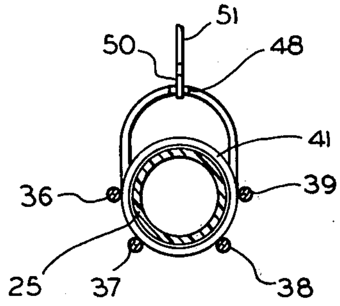
FIG. 4 is a perspective view of the hose cradle according to one preferred form of the invention.

A cradle 35 according to the preferred form of the invention is shown in FIG. 4 and the cradle 35, in combination with hose 25, is shown in FIGS. 1-3. Cradle 35 is generally C-shaped and, as will be described hereinafter, includes a hose guiding channel along the outside surface of the "C". The dimensions of cradle 35 will vary, as will the radius of curvature of the curved portion of the cradle, depending on the size of cleaner 10 and the size and characteristics of the particular hose 25 with which it is to be used.

In the illustrated embodiment of FIG. 4 cradle 35 is constructed from four tubular, C-shaped ribs 36-39, two generally circular hose guide rings 40-41 and two generally oblong hose guide rings 42-43. The four ribs 36-39 are arranged to form a hose guide channel 44 around the outside of cradle 35 and the channel has a diameter of curvature equal to or slightly exceeding the outside diameter of the hose 25. Ribs 36-39 are secured in place by guide rings 40-43, such as by welding or other suitable means.

In FIG. 4, it can be noted that the four guide rings are approximately evenly spaced one from another, with the circular hose guide rings 40-41 being located between the oblong rings 42-43. The illustrated form shows ring 42 located near one end of the cradle 35 while ring 43 is located at the approximate mid-point of the C of cradle 35. Rings 40 and 41 are located therebetween. The circular rings 40-41 have a diameter just slightly exceeding the diamater of hose 25. This forces the hose 25, at the area between rings 40-41 to bend around the curvature of the cradle 35, a bend which is nonstraining for the particular hose. With regard to the outer rings 42-43, those rings are oblong having a first portion between the ribs 36-39 which have a diameter of curvature also just exceeding the hose diameter. The portion of these rings 42-43 most remote from cradle 35 also has an equal diameter of curvature. These rings 42-43, because of their oblong shape, permit hose 25 to float free of the hose guide channel 44 of cradle 35, in varying degrees as will be explained hereafter. The number of ribs and guide rings of the illustrated embodiment and the cradle and guide ring concepts can be variously embodied and adapted for different sized hoses. For example, that portion of cradle 35 extending away from the guide rings may be shortened or lengthened as desired. Also, while the illustrated embodiment shows the structural components of cradle 35 to be tubular in form, other structural components of the desired shape can be employed.

Cradle 35 is supported from the free end 32 of boom 30 by means of a cable 51 passing through a pulley 53. The pulley 53 is mounted for free running on a bracket 54 at end 32 of the boom 30. (See FIG. 2.) The cable 51 includes hook fasteners 50 on each end, the fasteners in turn being attached to brackets 48, one of which is located on each of rings 42 and 43 at the portion thereof most remote from the hose guide channel 44 of cradle 35.

The method of operation of the cradle and pulley hose support system of the present invention can best be understood by reference to FIGS. 1–3. In FIG. 1, the hose 25 is in a non-use or travel position with the boom 30 being horizontal. The free end 26 of the hose 25 is coupled to receptacle 16 by a chain 27 or other suitable fastener. Hose 25 is shown to be bent around cradle 35 to permit the attachment of its free end 26 in the manner shown. Ring 42 is shown to be higher than ring 43 and the C-shaped cradle 35 opens generally toward tailgate 23 of receptacle 16.

In FIG. 2, the boom 30 is in a slightly elevated position and the hose 25 has been released to permit collection or loading of material into receptacle 16. The position of the cradle 35 with respect to the length of hose 25, as well as the orientation of the cradle 35, has been changed as a result of the boom elevation. First, the guide ring 42 of cradle 35 has moved closer to the inlet opening 21 of receptacle 16 and guide ring 42 has dropped somewhat with respect to the pulley 53. There has been a corresponding increase in the height of guide ring 43 with respect to the pulley, and the hose 25 is shown lying within the channel 44 of cradle 35 in the vicinity of the four guide rings 40–43.

In FIG. 3, the boom has been elevated to its maximum height, such as would occur during unloading of cleaner 10. Here the entire cradle 35 has moved even closer to inlet opening 21 and the relative vertical positions of guide rings has been substantially reversed as compared to the position shown in FIG. 1. The opening of the C-shaped cradle 35 now is directed downwardly and hose 25 is supported in channel 44 throughout the bend caused by boom elevation.

It should again be emphasized that the movement of cable 51 on pulley 53 and the corresponding movement of cradle 35 both along the length of hose 25 and rotationally are caused by the natural forces created by boom elevation and hose bending characteristics and not by any manual operation of the machine personnel. It should also be noted from the illustrations of FIGS. 1–3 that the free end of hose 25 is actually raised more than the distance by which the end 32 of the boom 30 is raised. The additional lifting capacity results from the combination of boom elevation and the simultaneous vertical movement of guide ring 43.

Figure 5:
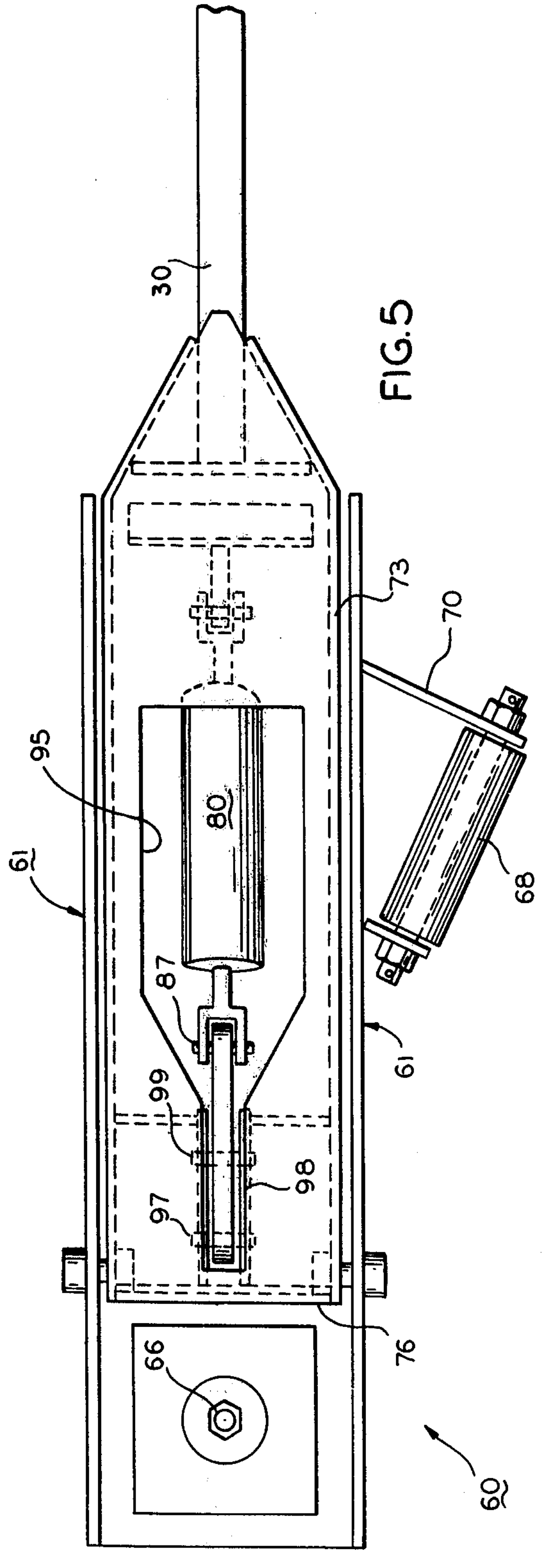
FIG. 5 is a top view of a portion of the boom according to the preferred form of the invention.
Figure 6:
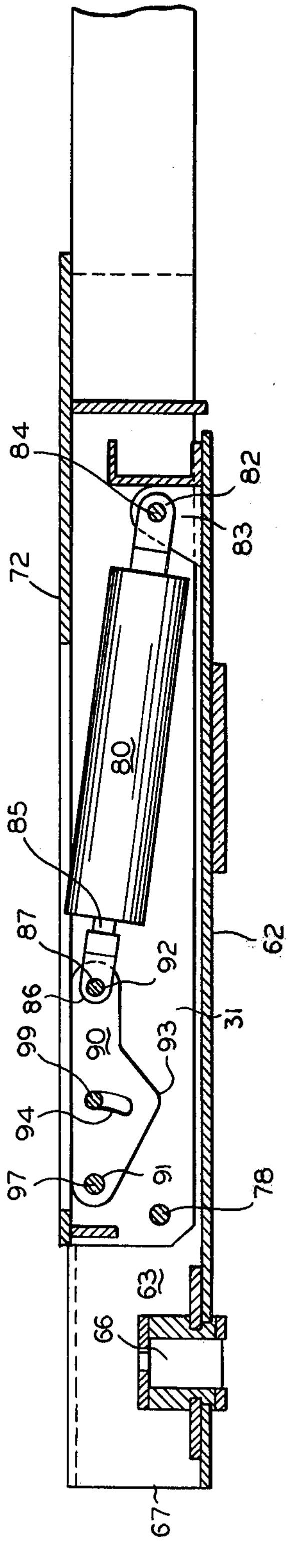
FIG. 6 is a cross-section taken along the line 6—6 of FIG. 5 showing the boom link according to a preferred form of the invention.

The novel boom link arrangement of the present invention can best be understood by reference to FIGS. 5 and 6. The boom 30 is attached to cleaner 10 by a boom support bracket 60 comprising a pair of elongated parallel and spaced apart frame members 61 and a bottom plate 62. The frame members and the bottom plate define a rectangular channel 63 above plate 62 and between the frame members 61.

The boom support bracket 60 is mounted on a top planar surface 64 of receptacle 16 by a pivot pin 66 located and passing through bottom plate 62 adjacent end 67 of channel 63. Pin 66 permits the frame members 61 and channel 63 to rotate about the axis of the pin. Such rotation is facilitated by a pair of rollers 68, one mounted on the outside of each of frame members 61 on a pair of brackets 70. The pin 66 and the rollers are arranged so that bottom plate 62 of the support bracket 60 is spaced apart by a small distance from top planar surface 64 of receptacle 16. Means (not shown) may be provided for powering the rotation of support bracket 60 about the pivot pin 66 or the horizontal rotation can be accomplished manually by the operator, as will be more fully understood hereafter. The pivot pin 66 and rollers 68 have not been described in detail because such features in and of themselves are known to the art and do not form part of the present invention.

First end 31 of boom 30 is supported for vertical elevation on support bracket 60 between frame members 61. In most machines end 31 will be broader than the remainder of boom 30 and includes a top plate 72 and two downwardly extending sides 73. In length, end 31 of boom 30 is preferably somewhat shorter than channel 63 of the support bracket 60. The width of top plate 72 and the length of sides 73 are selected so that end 31 fits between frame members 61 and the top plate 72 and is flush with the top surfaces of frame members 61. The inside end 76 of end 31 of the boom is journaled for rotation between frame members 61 by a hinge pin 78 passing through frame members 61 and sides 73 of the boom end 31. The pin 78 may include suitable bearings (not shown).

End 31 of boom 30 is also supported within the support bracket 60 by a hydraulic cylinder 80 longitudinally disposed within channel 63. The cylinder includes a first end 82 mounted on a bracket 83 by pin 84. The attachment permits the cylinder to rotate about pin 84 as the boom is elevated about hinge pin 78. The cylinder 80 also includes an extensible piston 85 and when the cylinder is charged with hydraulic fluid the piston may be extended after in a direction generally toward the hinge pin 78. The free end 86 of piston 85 includes a clevis and a pin 87 for coupling the hydraulic cylinder's piston to a boom link 90.

Link 90 is an elongated plate having apertures 91 and 92 adjacent each end and, in the preferred form, a lobe 93 in the vicinity of the middle of link 90. Link 90 also includes a slot 94 in lobe 93 extending generally in a direction perpendicular to the long axis of link 90.

Link 90 is attached between end plate 76 of boom 30 and clevis 80 of the hydraulic piston 85 in a manner which will now be described. Link 90 is located within channel 63, with aperture 91 located near hinge pin 78 and above it. A pin 97 passes through aperture 91 and locks one end of link 90 to end 31 of the boom. The pin may be held by the sides 73 of end 31 of the boom or may be affixed, as shown in the FIGURES, to a pair of parallel link support plates 98 welded to top plate 72. See FIG. 5.

Aperture 92, on the opposite end of link 90 is pivotally mounted to pin 87. The link 90 then is secured in place so that slot 94 extends generally from top plate 72 toward the base plate 62 of support bracket 60. The final feature of the link assembly is a retainer pin 99 passing perpendicularly through slot 94 and again fixed in place by being secured to side members 73 of the boom end 31 or to the link support plates 98. The retainer pin 99 is located at the top of slot 94 when the boom 30 is in the lowered or horizontal position and the slot 94 extends downwardly from retainer pin 99. An opening 95 in top plate 72 is provided to permit the end of link 90 adjacent the piston connection, and also a portion of the piston itself, to rise above the plane of top plate 72 as the piston 85 is extended, all as explained below.

Now that the construction of the link assembly has been described, its method of operation and advantages will now be discussed. Assuming that the boom 30 is horizontally rotated to the desired operating position, and it is desired to elevate the boom 30, the hydraulic source for cylinder 80 is activated to extend piston 85. Such extension exerts a force axially of the piston 85 through pin 87 to the area of link 90 adjacent aperture 92. Boom 30 is elevated by the extension of piston 85 exerting force through link 90 only after the link has pivoted to the positions whereby the retainer pin 99 is at the bottom of slot 94. Retainer pin 99 reaches this position after elevating the link approximately 10°-15°, the complete retraction of piston 85 locks the boom in the horizontal position shown in FIGS. 1-3 and 5-6.

The lifting advantage obtained by employing the novel link assembly of the present invention arises from a transposition of the moment arm of the hydraulic force from a first position in which the moment arm is aligned substantially on the hinge pin 78 to a second position after the first 10°-15° or so of elevation where the moment arm of the lifting force is well above the hinge pin. Such transposition results in a multiplication of the lifting torque by two or three times. This advantage is accomplished without increasing the overall headroom requirements for cleaner 10. Without using the novel boom link assembly, such advantageous transposition of the lifting force moment could only be accomplished by sacrificing headroom (e.g., by using a boom normally in a slanted position), by increasing the cylinder and piston size, or by arranging the cylinder initially at an advantageous angle (with a corresponding sacrifice of the capacity or payload of receptacle 16 or headroom).

In summary, the hose cradle and boom link concepts of the present invention provide a combined system for optimizing hose lifetime and headroom limitations in industrial vacuum loaders and cleaners. The cradle has a curvature selected for the bending characters of the hose with which it is to be used and the cradle position automatically adjusts during boom elevation and lowering to compensate for the weight distribution of the hose on the cradle. At the same time the cradle position relative to the hose is automatically adjusted. The boom lift system utilizes a link to provide increased lifting torque about the boom hinge pin without sacrificing the headroom requirements for the vehicle and without decreasing the payload capacity of the loader body.

Many variations of the principles of the present invention can be made by those skilled in the art to adapt the principles to various types and sizes of vacuum machines. In addition, the cradle principle can be adapted to hose manipulating systems not relating to vacuum hose and the boom link feature can be used for booms other than those employed to manipulate vacuum hoses. So while the present invention has been described in connection with a particular preferred embodiment, it is not to be limited thereby but is to be limited solely by the claims which follow.

I claim:

1. A boom device comprising:

a boom support bracket;

an elongate boom having first and second ends, said first end being pivotally mounted to said bracket for permitting vertical elevation of said second end of said boom with respect to said first end;

cylinder means having an extensible piston at one end and a butt end, the butt end of said cylinder being pivotally secured beneath said boom and intermediate the ends thereof and the piston end of said cylinder being located intermediate said first end of said boom and said butt end of said cylinder means;

an elongate link having a first end pivotally mounted to said boom generally adjacent said first end thereof and a second end pivotally mounted to the said piston; and slot and retainer pin means coupling said link and said boom for permitting elevation of said second end of said link for a controlled distance upon extension of said piston without causing elevation of said boom.

2. The invention set forth in claim 1 wherein said link is an elongate plate disposed in the plane of said piston and includes a slot, said system also including a retainer pin secured to said boom and passing perpendicularly through said slot, said pin and slot being arranged so that when said boom is in a horizontal position said pin is disposed at one end of said slot and when said second end of said link is elevated by said controlled distance said pin is at the opposite end of said slot.

3. The invention set forth in claim 2 wherein said controlled distance is between 10°-15°.

4. A boom apparatus comprising:

a boom support bracket including a bottom plate and two parallel support plates extending perpendicularly therefrom which form a channel therebetween, an elongate boom having a first end disposed within said channel and pivotally mounted between said support plates, hydraulic cylinder means disposed within said channel and below said boom, said cylinder having a first butt end pivotally mounted to said bottom plate and a piston directed generally toward said first end of said boom, an elongate link plate disposed in a plane parallel to and between said support plates, a pair of link support plates secured to said first end of said boom and disposed on opposite sides of said link plate, a first end of said link plate being pivotally mounted between said link support plates, the second end of said link plate being pivotally attached to said piston, said link plate including a slot intermediate its ends and directed generally perpendicularly to said bottom plate, and retainer pin means secured to said link support plates and passing perpendicularly through said slot.

5. The invention set forth in claim 4 wherein said slot is arranged so that when said boom is substantially parallel to said bottom plate said pin is at the top of said slot and so that when said second end of said link means has been elevated 10°-15° said pin will be at the bottom of said slot.

* * * * *